United States Patent
Wang et al.

(10) Patent No.: US 9,306,778 B2
(45) Date of Patent: Apr. 5, 2016

(54) ENABLING MODULATION MODE SELECTION

(71) Applicant: Telefonaktiebolaget L M Ericsson (publ), Stockholm (SE)

(72) Inventors: Meng Wang, Solna (SE); David Hammarwall, Vallentuna (SE); Yu Yang, Solna (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 14/387,280

(22) PCT Filed: Sep. 1, 2014

(86) PCT No.: PCT/SE2014/051002
§ 371 (c)(1),
(2) Date: Sep. 23, 2014

(87) PCT Pub. No.: WO2015/030669
PCT Pub. Date: Mar. 5, 2015

(65) Prior Publication Data
US 2015/0117568 A1    Apr. 30, 2015

(30) Foreign Application Priority Data
Sep. 2, 2013  (SE) ........................ 1300570

(51) Int. Cl.
*H04L 27/36*  (2006.01)
*H04L 27/00*  (2006.01)
*H04L 27/34*  (2006.01)
*H04L 5/14*   (2006.01)
*H04L 5/00*   (2006.01)

(52) U.S. Cl.
CPC .......... *H04L 27/0008* (2013.01); *H04L 5/1453* (2013.01); *H04L 27/34* (2013.01); *H04L 5/006* (2013.01); *H04L 5/0046* (2013.01); *H04L 5/0091* (2013.01)

(58) Field of Classification Search
CPC ............................ H04L 27/0008; H04L 27/34
USPC ........................................................ 375/298
See application file for complete search history.

(56) References Cited

U.S. PATENT DOCUMENTS

2013/0223255 A1 *  8/2013  Enescu et al. ................. 370/252
2013/0286961 A1 * 10/2013  Vermani et al. ............... 370/329

(Continued)

FOREIGN PATENT DOCUMENTS

WO    WO 2013123961 A1 *  8/2013
WO    WO 2014029108 A1 *  2/2014
WO    WO 2014161820 A1 * 10/2014

OTHER PUBLICATIONS

Nsn et al., "Tx EVM and Rx EVM for DL 256QAM," R4-134065: 3GPP TSG-RAN WG4 Meeting #68, Agenda Item 10.8, Aug. 19-23, 2013, Barcelona, Spain, 7 pages.

(Continued)

*Primary Examiner* — Juan A Torres
(74) *Attorney, Agent, or Firm* — Withrow & Terranova, PLLC

(57) ABSTRACT

It is presented a method, performed in a network node, for enabling selection of modulation mode for a user equipment, UE. The method comprises: determining whether to provide higher order modulation, HOM, mode support for the UE; when HOM mode support is to be provided, selecting at least one HOM table for the UE; and when HOM mode support is not to be provided, selecting at least one non-HOM table for the UE.

22 Claims, 3 Drawing Sheets

(56) References Cited

U.S. PATENT DOCUMENTS

2014/0092785 A1* 4/2014 Song et al. .................... 370/280
2015/0036590 A1* 2/2015 Lahetkangas et al. ........ 370/328

OTHER PUBLICATIONS

Panasonic, "Discussion on 256QAM for Downlink in Small Cell Deployments," R1-131328: 3GPP TSG-RAN WG1 Meeting 72bis, Agenda Item 7.2.5.2.3, Apr. 15-19, 2013, Chicago, USA, 6 pages.

International Search Report and Written Opinion for International Patent Application PCT/SE2014/051002, mailed Dec. 30, 2014, 13 pages.

Author Unknown, "Technical Specification Group Radio Access Network; Evolved Universal Terrestrial Radio Access (E-UTRA); Physical layer procedures (Release 10)," 3GPP Organisational Partners, Technical Specification 36.213, V10.4.0, Dec. 2011, 125 pages.

* cited by examiner

ENABLING MODULATION MODE SELECTION

This application is a 35 U.S.C. §371 national phase filing of International Application No. PCT/SE2014/051002, filed Sep. 1, 2014, which claims the benefit of Swedish Application No. 1300570-7, filed Sep. 2, 2013, the disclosures of which are incorporated herein by reference in their entireties.

TECHNICAL FIELD

The invention relates to methods, network nodes, user equipments, computer programs and computer program products for enabling selection of modulation mode.

BACKGROUND

In current LTE (Long Term Evolution) systems, the set of modulation schemes for both downlink and uplink includes QPSK (Quadrature Phase-Shift Keying), 16QAM (16 Quadrature Amplitude Modulation) and 64QAM (64 Quadrature Amplitude Modulation), corresponding to two, four and six bits per modulation symbol, respectively. In LTE evolution, especially for the scenarios with high SINR (Signal to Interference and Noise Ratio), e.g. in small cell deployments with terminals close to cell site, one means to provide higher date rate with given transmission bandwidth is the use of higher order modulation (herein referring to modulation schemes that are higher than 64QAM, e.g. 256QAM, 512QAM) that allows for more information bits to be carried per modulation symbol. Higher order modulation can be utilized both in downlink and uplink to enhance the spectral efficiency. For example, in 3GPP (3rd Generation Partnership Project) Rel-12 Small Cell study item, it has been discussed to introduce a higher order modulation scheme (e.g. 256QAM) for the downlink.

In order to adopt higher order modulation schemes in LTE systems, new MCS/CQI index tables that cover higher order modulation need to be implemented and UE (User Equipment) receivers need to be upgraded to support higher order modulation. On the other hand, in some occasions such as for legacy UEs, current modulation schemes are desired. Hence, there is a need for a way to not only allow higher order modulation to be used, but also supports legacy UEs.

SUMMARY

It is an object to provide a way in which higher order modulation as well as backward compatibility is supported—

According to a first aspect it is presented a method, performed in a network node, for enabling selection of modulation mode for a user equipment, UE. The method comprises: determining whether to provide higher order modulation, HOM, mode support for the UE; when HOM mode support is to be provided, selecting at least one HOM table for the UE; and when HOM mode support is not to be provided, selecting at least one non-HOM table for the UE. Hence, the network node determines, per UE, whether to use HOM table(s) or non-HOM table(s). By using both HOM tables and non-HOM tables, HOM support can be provided when beneficial and non-HOM (e.g. legacy) support can be provided when beneficial. For example, communication with a legacy UE which does not support HOM would always use non-HOM tables. For UEs supporting HOM, non-HOM tables could still be used e.g. when beneficial for power consumption.

The at least one HOM table may comprises at least one entry for 256 QAM, Quadrature Amplitude Modulation. Support for 256 QAM is being developed is beneficial to be used with this method.

Each HOM table may comprise at least one entry with a modulation of a higher order compared to all entries of any non-HOM table of the same type.

The at least one HOM table may include an MCS index table and the at least one non-HOM table includes an MCS index table.

The at least one HOM table may include a CQI index table and the at least one non-HOM table includes a CQI index table.

The method may further comprise: when HOM mode support is to be provided, signalling the selected at least one HOM table to the UE; and when HOM mode support is not to be provided, signalling the selected at least one non-HOM table to the UE. In this way, the network node and the UE are synchronised with regard to the (HOM/non-HOM) table(s) used.

The method may further comprise: when HOM mode support is to be provided, signalling a reference to the selected at least one HOM table to the UE; and when HOM mode support is not to be provided, signalling a reference to the selected at least one non-HOM table to the UE.

The step of determining whether to provide HOM mode support may comprise determining to provide HOM support when HOM is expected to provide a relative spectral efficiency increase greater than a relative UE power consumption increase. In this way, power consumption is not increased by using HOP when spectral efficiency is not increased sufficiently.

The method may further comprise: receiving a recommendation whether to support HOM from the UE, in which case the step of determining whether to provide HOM mode support comprises considering the recommendation whether to support HOM from the UE.

According to a second aspect it is presented a network node arranged to enable selection of modulation mode for a user equipment, UE. The network node comprises: a processor; and a memory storing instructions that, when executed by the processor, cause the network node to: determine whether to provide higher order modulation, HOM, mode support for the UE; when HOM mode support is to be provided, select at least one HOM table for the UE; and when HOM mode support is not to be provided, select at least one non-HOM table for the UE.

The at least one HOM table may comprise at least one entry for 256 QAM, Quadrature Amplitude Modulation.

Each HOM table may comprise at least one entry with a modulation of a higher order compared to all entries of any non-HOM table of the same type.

The at least one HOM table may include an MCS index table and the at least one non-HOM table includes an MCS index table.

The at least one HOM table may include a CQI index table and the at least one non-HOM table includes a CQI index table.

The network node may further comprise instructions that, when executed by the processor, cause the network node to: when HOM mode support is to be provided, signal the selected at least one HOM table to the UE; and when HOM mode support is not to be provided, signal the selected at least one non-HOM table to the UE.

The network node may further comprise instructions that, when executed by the processor, cause the network node to: when HOM mode support is to be provided, signal a reference to the selected at least one HOM table to the UE; and when HOM mode support is not to be provided, signal a reference to the selected at least one non-HOM table to the UE.

The instructions to determine whether to provide HOM mode support may comprise instructions that, when executed by the processor, cause the network node to: determine to provide HOM support when HOM is expected to provide a relative spectral efficiency increase greater than a relative UE power consumption increase.

The network node may further comprise instructions that, when executed by the processor, cause the network node to: receive a recommendation whether to support HOM from the UE; and wherein the instructions to determine whether to provide HOM mode support comprise instructions that, when executed by the processor, cause the network node to consider the recommendation whether to support HOM from the UE.

According to a third aspect it is presented a network node comprising: means for determining whether to provide higher order modulation, HOM, mode support for a user equipment, UE; means for, when HOM mode support is to be provided, selecting at least one HOM table for the UE; and means for, when HOM mode support is not to be provided, selecting at least one non-HOM table for the UE.

According to a fourth aspect it is presented a computer program for enabling selection of modulation mode for a user equipment, UE. The computer program comprises computer program code which, when run on a network node, causes the network node to: determine whether to provide higher order modulation, HOM, mode support for the UE; when HOM mode support is to be provided, select at least one HOM table for the UE; and when HOM mode support is not to be provided, select at least one non-HOM table for the UE.

According to a fifth aspect it is presented a computer program product comprising a computer program according to the fourth aspect and a computer readable means on which the computer program is stored.

According to a sixth aspect it is presented a method, performed in a user equipment, UE, for enabling selection of modulation mode for the UE. The method comprises: receiving signalling indicating whether a HOM, higher order modulation, table is to be applied or a non-HOM table is to be applied; applying a HOM table when a HOM table is to be applied; and applying a non-HOM table when a non-HOM table is to be applied.

The method may further comprise: transmitting a recommendation whether to support HOM.

According to a seventh aspect it is presented a user equipment, UE, arranged to enable selection of modulation mode for the UE. The UE comprises: a processor; and a memory storing instructions that, when executed by the processor, cause the UE to: receive signalling indicating whether a HOM, higher order modulation, table is to be applied or a non-HOM table is to be applied; apply a HOM table when a HOM table is to be applied; and apply a non-HOM table when a non-HOM table is to be applied.

The UE may further comprise instructions that, when executed by the processor, cause the UE to transmit a recommendation whether to support HOM.

According to an eighth aspect it is presented a user equipment, UE, comprising: means for receiving signalling indicating whether a HOM, higher order modulation, table is to be applied or a non-HOM table is to be applied; means for applying a HOM table when a HOM table is to be applied; and means for applying a non-HOM table when a non-HOM table is to be applied.

According to a ninth aspect it is presented a computer program for enabling selection of modulation mode for a user equipment, UE. The computer program comprises computer program code which, when run on the UE, causes the UE to: receive signalling indicating whether a HOM, higher order modulation, table is to be applied or a non-HOM table is to be applied; apply a HOM table when a HOM table is to be applied; and apply a non-HOM table when a non-HOM table is to be applied.

According to a tenth aspect it is presented a computer program product comprising a computer program according to the ninth aspect and a computer readable means on which the computer program is stored.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which.

DETAILED DESCRIPTION

Figure 1:
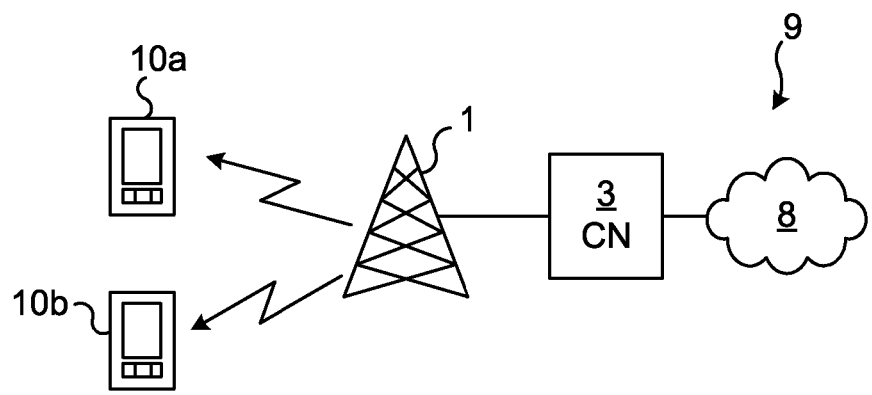
FIG. 1 is a schematic diagram illustrating an environment in which embodiments presented herein can be applied.

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

For downlink data transmission in LTE (Long Term Evolution), the eNB (evolved Node B, one form of a network node) typically selects the MCS (Modulation and Coding Scheme) depending on CQI (Channel Quality Indicator) feedback transmitted by the UE in the uplink. The CQI feedback indicates the date rate that can be supported by the downlink channel given the present channel condition and UE receiver capability.

The LTE specifications are designed to provide signaling for indication between the eNB and the UE. In the downlink, the knowledge about the MCS adopted for PDSCH transmission is indicated by a five bit field in a DCI (Downlink Control Information) message. This MCS field corresponds to the MCS index table as shown in Table 1. In this table, of 32 combinations referred to by the MCS Index $I_{MCS}$, 29 are used to signal a MCS, each corresponding to a modulation and a transport block size (TBS), while 3 are reserved (e.g., to support adaptive retransmissions). All possible TBS can be described by a TBS table (e.g., Table 7.1.7.2.1-1 in 3GPP TS 36.213 v10.4.0) mapping a TBS index, and an allocation bandwidth into the corresponding transport block size (in bits).

TABLE 1

MCS index table for PDSCH transmission
(Table 7.1.7.1-1 in 3GPP TS 36.213 v10.4.0)

| MCS Index $I_{MCS}$ | Modulation Order $Q_m$ | TBS Index $I_{TBS}$ |
|---|---|---|
| 0 | 2 | 0 |
| 1 | 2 | 1 |
| 2 | 2 | 2 |
| 3 | 2 | 3 |
| 4 | 2 | 4 |
| 5 | 2 | 5 |
| 6 | 2 | 6 |
| 7 | 2 | 7 |
| 8 | 2 | 8 |
| 9 | 2 | 9 |
| 10 | 4 | 9 |
| 11 | 4 | 10 |
| 12 | 4 | 11 |
| 13 | 4 | 12 |
| 14 | 4 | 13 |
| 15 | 4 | 14 |
| 16 | 4 | 15 |
| 17 | 6 | 15 |
| 18 | 6 | 16 |
| 19 | 6 | 17 |
| 20 | 6 | 18 |
| 21 | 6 | 19 |
| 22 | 6 | 20 |
| 23 | 6 | 21 |
| 24 | 6 | 22 |
| 25 | 6 | 23 |
| 26 | 6 | 24 |
| 27 | 6 | 25 |
| 28 | 6 | 26 |
| 29 | 2 | reserved |
| 30 | 4 | |
| 31 | 6 | |

In the uplink, the UE reports CQI to assist the eNB to select the appropriate MCS for downlink transmission. Typically, the CQI are derived from the measurements on downlink reference signals. It should be noted that, the reported CQI represents the highest MCS that the PDSCH transmission can be decoded with a transport block error rate probability not exceeding 10%. The CQI is signalled to the eNB by the means of CQI index table. A 4 bit CQI value corresponds to a particular MCS out of 16 combinations in the CQI index table, as shown in Table 2. Each entry in the CQI index table corresponds to a modulation.

TABLE 2

CQI index table for PDSCH transmission
(Table 7.2.3-1 in 3GPP TS 36.213 v10.4.0)

| CQI index | modulation | code rate × 1024 | efficiency |
|---|---|---|---|
| 0 | out of range | | |
| 1 | QPSK | 78 | 0.1523 |
| 2 | QPSK | 120 | 0.2344 |
| 3 | QPSK | 193 | 0.3770 |
| 4 | QPSK | 308 | 0.6016 |
| 5 | QPSK | 449 | 0.8770 |
| 6 | QPSK | 602 | 1.1758 |
| 7 | 16QAM | 378 | 1.4766 |
| 8 | 16QAM | 490 | 1.9141 |
| 9 | 16QAM | 616 | 2.4063 |
| 10 | 64QAM | 466 | 2.7305 |
| 11 | 64QAM | 567 | 3.3223 |
| 12 | 64QAM | 666 | 3.9023 |
| 13 | 64QAM | 772 | 4.5234 |
| 14 | 64QAM | 873 | 5.1152 |
| 15 | 64QAM | 948 | 5.5547 |

Current LTE systems support three modulation schemes for both downlink and uplink: QPSK, 16QAM and 64QAM. Accordingly, the MCS index table, CQI index table and the corresponding fields for indication in DCI and UCI are designed for these three modulation schemes. Higher order modulation schemes are not supported in current LTE specifications. In order to support higher order modulation for higher spectral efficiency, new MCS/CQI tables that cover higher order modulation have become necessary. One option for new MCS/CQI tables is to keep the same size of the table by replacing part of the legacy entries with support for higher order modulation scheme. This approach doesn't increase the signaling, but decreases the resolution in the tables, which may significantly deteriorate the system performance in certain scenarios. Another option is to extend the tables with extra entries to support higher order modulation. This approach results in good performance due to high resolution in the tables. However, more bits are needed for the signaling between the eNB and the UE, which increases the signaling load.

On the other hand, however, in some occasions such as for legacy UEs or low SINR scenario, current non-HOM MCS/CQI tables are desired for some reasons, e.g. backward compatibility, UE power consumption and receiver complexity. For the legacy UEs which don't support higher order modulation, new tables can't be directly applied due to backward compatibility. For advanced UEs with support of higher order modulation, it is necessary to increase the linearity of the UE receiver to enable good performance when receiving higher order modulation. This can, for example, be implemented as a reconfiguration of the receiver front end (e.g., in the AGC and the low noise amplifier, LNA), which essentially translates to a higher current consumption when reception of 256 QAM is supported. This leads to increased power consumption and receiver complexity. Also note that, typically, such increased power consumption is present regardless if the actual transmission uses 256QAM or not, since the UE is unaware if 256QAM is used prior to the reception and hence tunes the receiver to support the most stringent requirement that can be anticipated.

Herein we disclose methods for an eNodeB to select whether or not to enable a higher order modulation mode (HOM mode) of a UE, which is capable of operating with a higher order modulation to thereby support HOM being selected. In particular, said methods take into consideration that enabling a HOM mode, will have detrimental effects on the UE's power consumption. For example, an eNB can be configured to only enable a HOM mode of a UE if the eNB expect the radio performance (e.g., spectral efficiency and/or block error rate) to improve by a sufficiently high margin, relative to operation in a basic mode not supporting HOM.

On the UE side, a UE capable of receiving a higher order modulation (higher in relation to a basic/baseline modulation order capability) can be configured in such a HOM mode by means of higher layer signaling, for example MAC or RRC signaling from the eNB. In particular, by means of embodiments presented herein, the UE can operate in a low power consumption mode (in which case it is unable to receive higher order modulation due to e.g., increased receiver end non linearity), unless the radio conditions are such that higher order modulation provides a substantial performance advantage, in which case the UE can adjust the receiver front end to allow reception of higher order modulation, at the cost of increased power consumption.

By employing higher order modulation, the LTE system can enhance spectral efficiency. Through embodiments presented herein, the LTE system gains flexibility to select appropriate modulation mode that achieves a good balance between spectral efficiency improvement and UE power consumption for different scenarios.

Note that although terminology from 3GPP LTE has been used in this disclosure, this should not be seen as limiting the scope to only the aforementioned system. Other wireless systems, including WCDMA, WiMAX (Worldwide Interoperability for Microwave Access), and UMB (Ultra Mobile Broadband), may also benefit from exploiting the ideas covered within this disclosure.

Also note that terminology such as base station/eNB should be considered non-limiting and does in particular not imply a certain hierarchical relation between the two; in general "eNB" could be considered as a network node and "UE" could be considered as a mobile device and these two devices communicate with each other over some radio channel.

In this following, a number of exemplary embodiments will be presented. It should be noted that these embodiments are not mutually exclusive. Components from one embodiment may be tacitly assumed to be present in another embodiment and it will be obvious to a person skilled in the art how those components may be used in the other exemplary embodiments.

FIG. 1 is a schematic diagram illustrating an environment where embodiments presented herein can be applied. In a mobile communication network 9, there are here one or more network nodes 1. The mobile communication network 9 may e.g. comply with any one or a combination of LTE, W-CDMA (Wideband Code Division Multiplex), CDMA2000 (Code Division Multiple Access 2000), GSM (Global System for Mobile communication), WCDMA (wideband code-division multiple access), WiMAX (worldwide interoperability for microwave access) or any other current or future mobile network, as long as the principles described hereinafter are applicable.

The mobile communication network 9 also comprises a core network 3 for central network functions and connectivity to other networks 8, such as other voice and/or data networks, including wide area networks, such as the Internet.

The network nodes, here also known as radio network nodes, 1 provide radio connectivity to a first UE 10a and a second UE 10b. Uplink (from the UE to the network node) and downlink (from the network node to the UE) communication between each UE 10 and the network node 1 occurs over a wireless radio interface. The quality of the wireless radio interface to each UE 10 varies over time and also depends on the position of the UE 10, due to effects such as fading, multipath propagation, interference, etc.

eNB Side

In one embodiment, a finite number of modulation modes are available. Each modulation mode includes a set of supported modulations (e.g., QPSK, 16QAM and 64QAM) and associated MCS and CQI tables. Said modulation modes include at least one HOM mode (i.e., modulation mode that covers higher order modulation) and the baseline modulation mode. In a further embodiment, there are two modulation modes, i.e. baseline mode and HOM mode. The set of available modulation modes is known at both the eNodeB and UE sides.

In one embodiment, each said modulation mode corresponds to a set of modulations and corresponds to a combination of MCS and CQI tables. For the HOM mode, the corresponding MCS and CQI tables are modified to include HOM entries to support higher order modulation. For example, the MCS/CQI tables in current 3GPP specification are shown in Table 1 and 2. Examples of modified MCS/CQI tables that include HOM (i.e., 256QAM), i.e. HOM tables, are shown in Table 3 and 4, where 256QAM entries are added to the tables and some QPSK entries are removed to keep the table sizes.

TABLE 3

One example of modified MCS index table with index 23-28 for 256QAM

| MCS Index $I_{MCS}$ | Modulation Order $Q_m$ | TBS Index $I_{TBS}$ |
|---|---|---|
| ~~0~~ | 2 | ~~0~~ |
| ~~1~~ | 2 | ~~1~~ |
| ~~2~~ | 2 | ~~2~~ |
| ~~3~~ | 2 | ~~3~~ |
| ~~4~~ | 2 | ~~4~~ |
| ~~5~~ | 2 | ~~5~~ |
| ~~6~~ | 2 | ~~6~~ |
| ~~7~~ 1 | 2 | 7 |
| ~~8~~ 2 | 2 | 8 |
| ~~9~~ 3 | 2 | 9 |
| ~~10~~ 4 | 4 | 9 |
| ~~11~~ 5 | 4 | 10 |
| ~~12~~ 6 | 4 | 11 |
| ~~13~~ 7 | 4 | 12 |
| ~~14~~ 8 | 4 | 13 |
| ~~15~~ 9 | 4 | 14 |
| ~~16~~ 10 | 4 | 15 |
| ~~17~~ 11 | 6 | 15 |
| ~~18~~ 12 | 6 | 16 |
| ~~19~~ 13 | 6 | 17 |
| ~~20~~ 14 | 6 | 18 |
| ~~21~~ 15 | 6 | 19 |
| ~~22~~ 16 | 6 | 20 |
| ~~23~~ 17 | 6 | 21 |
| ~~24~~ 18 | 6 | 22 |
| ~~25~~ 19 | 6 | 23 |
| ~~26~~ 20 | 6 | 24 |
| ~~27~~ 21 | 6 | 25 |
| ~~28~~ 22 | 6 | 26 |
| 23 | 8 | New index |
| 24 | 8 | New index |
| 25 | 8 | New index |
| 26 | 8 | New index |
| 27 | 8 | New index |
| 28 | 8 | New index |
| 29 | 2 | reserved |
| 30 | 4 | |
| 31 | 6 | |

TABLE 4

An example of the modified CQI index table
with index 12-15 for 256QAM

| CQI index | modulation | code rate × 1024 | efficiency |
|---|---|---|---|
| 0 | | out of range | |
| 1 | ~~QPSK~~ | 78 | 0.1523 |
| ~~2~~ | ~~QPSK~~ | ~~120~~ | ~~0.2344~~ |
| ~~3~~ | ~~QPSK~~ | ~~193~~ | ~~0.3770~~ |
| 4 | ~~QPSK~~ | ~~308~~ | ~~0.6016~~ |
| ~~5~~ | ~~QPSK~~ | ~~449~~ | ~~0.8770~~ |
| ~~6~~ 2 | QPSK | 602 | 1.1758 |
| ~~7~~ 3 | 16QAM | 378 | 1.4766 |
| ~~8~~ 4 | 16QAM | 490 | 1.9141 |
| ~~9~~ 5 | 16QAM | 616 | 2.4063 |
| ~~10~~ 6 | 64QAM | 466 | 2.7305 |
| ~~11~~ 7 | 64QAM | 567 | 3.3223 |
| ~~12~~ 8 | 64QAM | 666 | 3.9023 |
| ~~13~~ 9 | 64QAM | 772 | 4.5234 |
| ~~14~~ 10 | 64QAM | 873 | 5.1152 |
| ~~15~~ 11 | 64QAM | 948 | 5.5547 |
| 12 | 256QAM | New value | New value |
| 13 | 256QAM | New value | New value |
| 14 | 256QAM | New value | New value |
| 15 | 256QAM | New value | New value |

In one embodiment, a first modulation mode is used for the DL (downlink) transmission to the first UE (10a in FIG. 1), and in the DL transmission to the second UE (10b in FIG. 1), a second modulation mode is used. In other words HOM mode support can be provided independently between UEs. The modulation modes used for transmission can be updated regularly at a specific interval. In a further such embodiment said first and second UE are the same UE.

In a further embodiment, the first and second modulation modes used for transmission are selected from said set of available modulation modes to optimize the trade-off between the radio performance (e.g. spectral efficiency, block error rate) and the UE's power consumption for different channel and traffic characteristics.

In another embodiment, it is the eNodeB that determines the modulation mode to be used, i.e. whether to provide HOM mode support. In this procedure, the eNodeB first selects the set of supported modulations, based on which, the corresponding MCS/CQI tables is determined. In a further embodiment, the eNB decides whether the HOM mode is used and/or which HOM mode is used for transmission by selecting an entry in the MCS/CQI tables.

In one embodiment, the eNodeB decides the modulation mode adaptively, based on measurements and/or predefined parameters, which include expected high margin in radio performance improvement compared to non-HOM (e.g. spectral efficiency, block error rate), UE capability to support HOM, channel quality, UE recommendation for modulation mode or the combinations of above measurements or parameters.

In a further embodiment, the eNB decides the modulation mode, i.e. whether to provide HOM mode support for the UE (see the conditional HOM step 20 below), by maximizing the power efficiency, i.e., spectral efficiency per power consumption per at the UE. In other words, if the eNB expects that the UE can receive data sufficiently faster by adopting HOM for a data burst, i.e., the data reception at the UE is faster enough to compensate the UE Rx power increase by being able to go back in DRX (Discontinuous Reception) mode faster or the radio can be effectively turned off faster at the UE, then HOM mode (and the optimal HOM mode) will be configured. For example, if the power consumption at the UE is estimated to be increased 10% by enabling HOM mode, then HOM mode is selected only when the UE throughput (i.e. spectral efficiency) increase is higher than 10%, i.e., higher power efficiency. Alternatively, a predefined parameter can be implemented at the eNB: enableHom=spectral efficiency increase/power consumption increase, and HOM mode is configured if the predefined parameter is above a predetermined threshold, i.e., enableHom>X.

In a further embodiment, in order to estimate the said power efficiency and/or predefined parameter enableHom, the eNB is aware of the power consumption increase levels between different HOM mode and non-HOM mode. The said power increase levels can be estimated at actual UE devices by averaging previous measurements for different modulation modes. The eNB obtains the power increase level via RRC signaling and stores it at the network unless receiving updated values. The spectral efficiency increase can be calculated and estimated at the eNB based on modulation order increase and scheduling decisions. For example, theoretically, the spectral efficiency increase of using 256QAM over 64QAM is 33%. With knowledge of power efficiency and spectral efficiency increase between different HOM modes, the eNB is able to make decision using aforementioned embodiment.

In another embodiment, HOM modes is enabled, i.e. HOM mode support is enabled for the UE (see the conditional HOM step 20 below), by the eNB only when the power consumption increase levels between HOM mode and non-HOM mode is below a predetermined threshold, i.e., power consumption increase<x %.

In another further embodiment, HOM modes is enabled, i.e. HOM mode support is enabled for the UE (see the conditional HOM step 20 below), by the eNB only when the spectral efficiency increase levels between HOM mode and non-HOM mode is above a predetermined threshold, i.e., spectral efficiency increase>y %.

In another embodiment, the eNB decides configuring to HOM mode automatically, i.e. supports HOM mode, for particular UE models with dedicated optimizations, in which HOM mode is always prioritized for such UE models. In a further embodiment, the said UE models with dedicated optimizations can be the UEs with high penetration or particularly high performance demand with less requirements on power consumption. For example, there can be a new UE category defined with high performance demand and thus such UEs are always configured with dedicated optimization by applying HOM.

In one embodiment, the eNB accounts for information conveyed by the UE regarding its sensitivity to power consumption. In a further embodiment, the eNB receives from the UE the sensitivity to power increase in HOM mode as part of the UE's power performance profile. For example, the eNodeB can take the Rel-9 UE deviceType value "noBenFromBatConsumpOpt" to differentiate battery critical devices. Alternatively, additional power consumption sensitivity parameters can be introduced to convey the UEs sensitivity to power consumption for higher order modulation. The information from the UE can then be used to determine when HOM mode is to be supported.

In a further embodiment, if the UE types are insensitive to power increase, the eNB can configure HOM mode when a specific amount of throughput gain and higher is expected. Otherwise, the said power efficiency (spectral efficiency per power consumption) should be optimized for the right modulation mode.

In one embodiment, the eNodeB explicitly informs the UE which modulation mode is used for transmission. The said information sent from the eNodeB to the UE can be part of an RRC or MAC message.

In another embodiment, the eNodeB receives a recommendation from the UE for the modulation mode to be used. In a further such embodiment, the UE recommends a CQI table, which implies a corresponding modulation mode. The said recommendation is signalled to the eNodeB via RRC or MAC message.

In one embodiment, the eNodeB can also simply follow the recommendation for modulation mode from the UE.

In another embodiment, the decision on the modulation mode made by the eNodeB can also be based on the transmission rank. Particularly, if the eNB scheduler decides to use higher rank for the transmission, then the HOM mode is selected and information about the HOM mode is sent from the eNodeB to the UE as mentioned in above embodiments. In a further embodiment, said HOM decision method only applies to the case where more than one transmit antennas are configured for the serving node (e.g., more than only one CRS port, or only one CSI-RS port). For example, given an eNB equipped with 4 or 8 transmit antennas, when rank$>=2$ is adopted for transmission, HOM mode can be activated by the eNB.

In a further embodiment, the eNodeB first informs the UE the intention to motivate/demotivate HOM mode. The eNodeB activates/deactivates HOM mode after receiving a confirmation from the UE which is ready for HOM/non-HOM mode.

UE Side

In one embodiment, the UE receives the information about which modulation mode is used for one or more transmissions. This corresponds to the receive HOM signalling step 30 described below. In a further such embodiment, said information is contained in RRC or MAC message.

Optionally, this information can comprise information about what MCS and/or CQI table to use. Optionally, this information comprises information about what entry in the MCS table and/or what entry in the CQL table to use.

In one embodiment, based on said information, the UE employs a corresponding mode for reception, i.e. performance mode for higher order modulation or low power consumption mode otherwise. This corresponds to the apply HOM signalling step 32 described below.

In a further embodiment, if the UE is aware of that higher order modulation is to be used, it applies the high current state with high receiver linearity to support higher order modulation transmission, forming part of the apply HOM signalling step 32 below. Otherwise, the UE falls back to a low current state for high power efficiency. In one embodiment, the UE recommends a modulation mode (among HOM modes and non-HOM mode) to the eNodeB. In such embodiment, the UE selects one from the set of available modulation modes and recommend it to the eNodeB. In a further embodiment, the said recommendation is made by the UE by maximizing the power efficiency, i.e., spectral efficiency per power consumption at the UE.

In one embodiment, the UE estimates the power increase levels between different modulation modes by averaging previous measurements for different modulation modes. For example, assuming that the UE measures the averaged power consumption with HOM mode to be $P_1$, and with non-HOM mode to be $P_2$, the power increase levels is calculated as power increase level=$P_1-P_2$. In one example, $P_1$ and $P_2$ starts with a default value and updated by the UE periodically. Then the UE sends the information of power increase level to the eNB via RRC signaling, corresponding to the send recommended HOM to eNB step 29 below.

In a further embodiment, what the UE recommends is a CQI table, which is equivalent to a corresponding modulation mode.

In a further embodiment, the said selection/recommendation at the UE is based on UE capability to support HOM, the measurements of DL channel condition, a priori deployment information and/or power consumption when receiving higher order consumption.

In one embodiment, some UE models with dedicated optimizations can explicitly inform the eNodeB that the UE is insensitive to power consumption increase and HOM mode is prioritized when throughput gain is expected. In a further embodiment, the said UE models are the ones with high penetration or particularly high performance demand with less requirements on power consumption.

In a further embodiment, the information regarding its sensitivity to power consumption increase is sent from the UE to the eNodeB as part of the UE's power performance profile. For example, the Rel 9 UE deviceType value "noBenFromBatConsumpOpt" can be used to differentiate battery critical devices. Alternatively, additional power consumption sensitivity parameters can be introduced to convey the UEs sensitivity to power consumption for higher order modulation.

In one embodiment, the recommendation of modulation mode/CQI table is part of an RRC or MAC message (in which case it typically applies until further notice) from the UE to the eNodeB. In case no recommendation is fed back from the UE to the eNodeB, the eNodeB can assume that this UE does not support HOM and no HOM mode will be assigned. In another embodiment, the decision on the modulation mode is made based on the higher transmission rank that the eNodeB adopts. The UE first receives the information that the eNodeB is intended to activate/deactivate HOM mode due to the variation of rank. The UE reconfigures receiver accordingly, e.g. current state, receiver frontend, etc., and then sends confirmation to the eNodeB.

Through embodiments presented herein, the LTE system gains flexibility to select appropriate modulation mode that achieves a good balance between spectral efficiency improvement and UE power consumption for different scenarios, i.e. HOM mode or non-HOM mode. This leads to further enhancement in overall system performance.

The proposed indicating mechanism enables the UE and the eNB to adjust to the proper receiving mode: performance mode for higher order modulation or power saving mode otherwise.

Embodiments presented herein can be applied in either or both of downlink and uplink.

Embodiments presented herein can be applied to any suitable wireless communication system such as GSM, WCDMA, WiMAX and UMB in addition to LTE.

Figure 2:
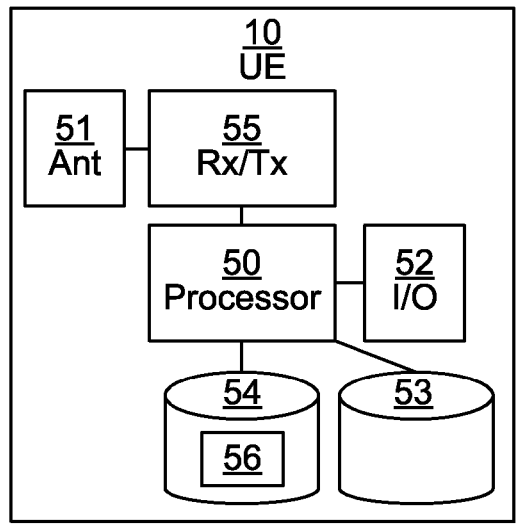
FIG. 2 is a schematic diagram illustrating some components of a UE.

FIG. 2 is a schematic diagram illustrating some components any one of the UEs described above, here illustrated as a single UE 10.

A processor 50 is provided using any combination of one or more of a suitable central processing unit (CPU), multiprocessor, microcontroller, digital signal processor (DSP), application specific integrated circuit etc., capable of executing software instructions 56 stored in a computer program product 54, e.g. in the form of a memory. The processor 50 may be configured to execute methods and/or procedures described herein, by executing instructions 56 stored in the computer program product 54.

The computer program product 54 may be a memory or any combination of read and write memory (RAM) and read only memory (ROM). The memory also comprises persistent storage, which, for example, may be any single one or combination of magnetic memory, optical memory, solid state memory or even remotely mounted memory.

The UE 10 further comprises a data memory 53, which comprises persistent and/or volatile memory for storing data, e.g. used by the instructions 56 when executed by the processor 50.

The UE 10 further comprises an I/O interface 52, comprising a user interface and/or local I/O.

The UE 10 also comprises one or more transceivers 55, comprising analogue and digital components, and a suitable number of antennas 51 for radio communication with a suitable network node 1. The processor 50 controls the general operation of the UE 10, e.g. by sending control signals to the transceiver 55 and receiving reports from the transceiver 55 of its operation.

Figure 3:
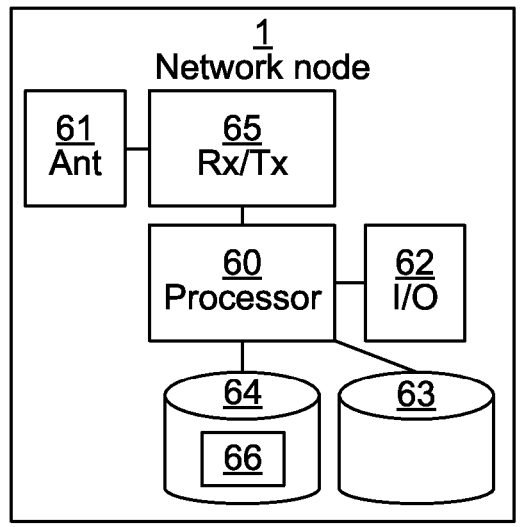
FIG. 3 is a schematic diagram illustrating some components of a radio network node.

FIG. 3 is a schematic diagram illustrating some components any one of the radio network nodes described above, here illustrated as a single radio network node 1.

A processor 60 is provided using any combination of one or more of a suitable central processing unit (CPU), multiprocessor, microcontroller, digital signal processor (DSP), application specific integrated circuit etc., capable of executing software instructions 66 stored in a computer program product 64, e.g. in the form of a memory. The processor 60 may be configured to execute methods and/or procedures described herein, by executing instructions 66 stored in the computer program product 64.

The computer program product 64 may be a memory or any combination of read and write memory (RAM) and read only memory (ROM). The memory also comprises persistent storage, which, for example, may be any single one or combination of magnetic memory, optical memory, solid state memory or even remotely mounted memory.

The radio network node 1 further comprises a data memory 63, which comprises persistent and/or volatile memory for storing data, e.g. used by the instructions 66 when executed by the processor 60.

The radio network node 1 further comprises an I/O interface 62 for communicating with the core network and optionally with other network nodes.

The radio network node 1 also comprises one or more transceivers 65, comprising analogue and digital components, and a suitable number of antennas 61 for radio communication with UEs/mobile devices within one or more radio cells. The processor 60 controls the general operation of the radio network node 1, e.g. by sending control signals to the transceiver 65 and receiving reports from the transceiver 65 of its operation.

Other network nodes, which are not radio network nodes, have the corresponding components to the radio network node, except the transceiver 65 and the antenna 61.

Figure 4:
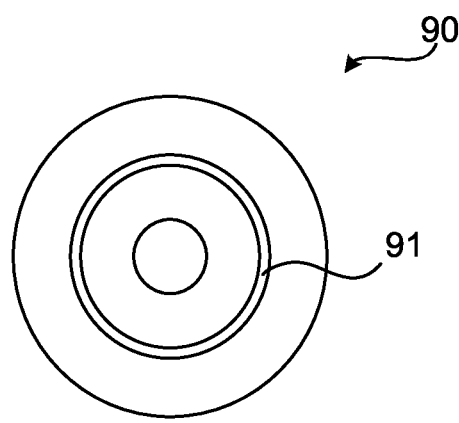
FIG. 4 shows one example of a computer program product comprising computer readable means.

FIG. 4 shows one example of a computer program product 90 comprising computer readable means. On this computer readable means a computer program 91 can be stored, which computer program can cause a processor to execute a method according to embodiments described herein. In this example, the computer program product is an optical disc, such as a CD (compact disc) or a DVD (digital versatile disc) or a Blu-Ray disc. As explained above, the computer program product could also be embodied in a memory of a device, such as the computer program product 56 of FIG. 2 or the computer program product 66 of FIG. 3. While the computer program 91 is here schematically shown as a track on the depicted optical disk, the computer program can be stored in any way which is suitable for the computer program product.

Figure 5A:
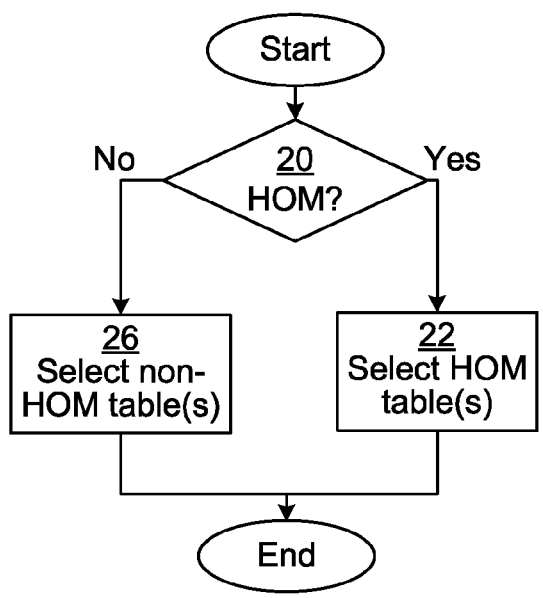
FIGS. 5A-B are flow charts illustrating embodiments of methods performed in the network node(s) of FIG. 1.
Figure 5B:
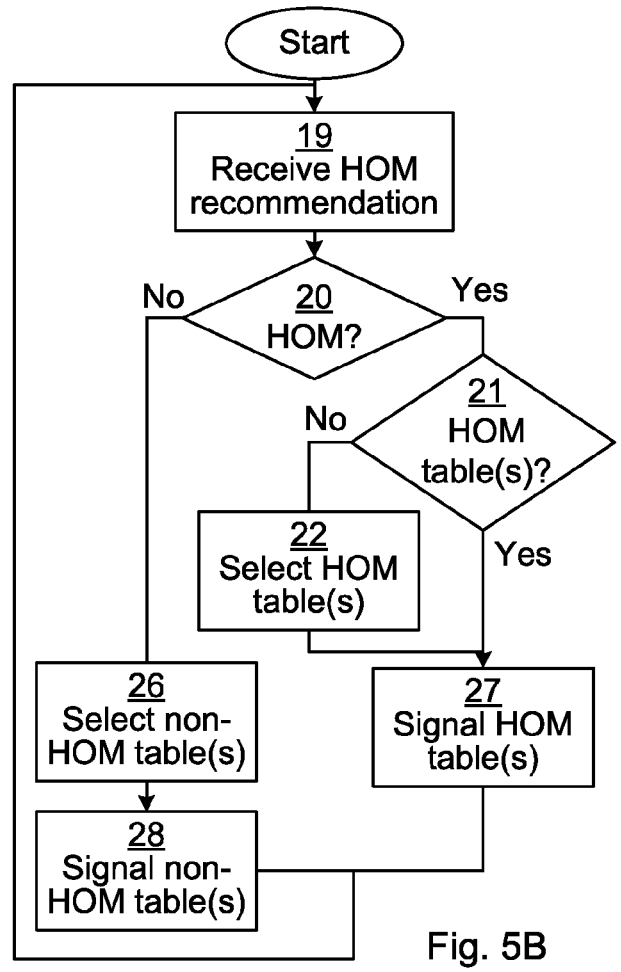

FIGS. 5A-B are flow charts illustrating embodiments of methods performed in the network node(s) of FIG. 1. First the method of the flow chart of FIG. 5A will be described. The method is performed to enable selection of modulation mode for a UE. The method is performed for a single UE, but can be performed in parallel in multiple instances for multiple respective UEs.

In a conditional HOM step 20, it is determined whether to provide HOM mode support for the UE. If this is the case, the method proceeds to a select HOM table(s) step 22. Otherwise, the method proceeds to a select non-HOM table(s) step 26.

This step can e.g. comprise determining to provide HOM support when HOM is expected to provide a relative spectral efficiency increase greater than a relative UE power consumption increase.

The conditional HOM step 20 can optionally be based on any one or more of the other criteria described above to decide modulation mode.

In the select HOM table(s) step 22, at least one HOM table is selected for the UE. As explained above, the at least one HOM table can comprise at least one entry for 256 QAM. Optionally, one or more entries for 512 QAM can be included in the selected HOM table.

Each HOM table comprises at least one entry with a modulation of a higher order compared to all entries of any non-HOM table of the same type. In other words, a HOM table being a MCS index table (such as Table 3 above) has one or more entries with a higher modulation than all entries of a non-HOM MCS index table (such as Table 1 above).

For instance for an MCS index table, Table 3 above is a HOM table where entries with MCS index 23-28 have a modulation order of 8, corresponding to 256 QAM. The corresponding non-HOM MCS index table is Table 1, where the highest modulation order is 6, corresponding to 64 QAM. Hence, MCS index table with HOM support has entries with a higher modulation than all entries of the MCS index table with no HOM support.

The same is true also for CQI index tables. See for example Table 4 above, being a CQI index table with HOM support, where the entries with CQI index 12-15 have a modulation of 256QAM. 256QAM is higher than all entries of the corresponding non-HOM CQI index table, Table 2, where the highest modulation is 64QAM.

In the select non-HOM table(s) step 26, at least one non-HOM table is selected for the UE. For instance, the at least one non-HOM table can be an MCS index table such as Table 1 above and/or a CQI index table such as Table 2 above.

Hence, the at least one HOM table can include an MCS index table and the at least one non-HOM table includes an MCS index table. Alternatively or additionally, the at least one HOM table includes a CQI index table and the at least one non-HOM table includes a CQI index table.

Looking now to FIG. 5B, only new or modified steps compared to the method illustrated by the flow chart of FIG. 5A will be described.

In a receive HOM recommendation step 19, a recommendation whether to support HOM is received from the UE. In such a case, the conditional HOM step 20 comprises considering the recommendation whether to support HOM from the UE.

Here, if the conditional HOM step 20 yields a positive result, the method proceeds to a conditional HOM table(s) step 21. On the other hand, if the conditional HOM step 20 yields a negative result, the method proceeds to the select non-HOM table(s) step 26.

In the conditional HOM table(s) step 21, it is determined whether the currently active table(s) for the UE is HOM table(s) or not. If this yields a positive result, the method proceeds to a signal HOM table(s) step 27. Otherwise, the method proceeds to the select HOM table(s) step 22.

In the signal HOM table(s) step 27, the selected at least one HOM table is signalled to the UE, e.g. using RRC (Radio Resource Control) signalling or MAC (Media Access Control) signalling. This signalling can comprise signalling a reference to the HOM table(s) to be used or signalling the actual entries of the HOM table(s).

In a signal non-HOM table(s) step 28, the selected at least one non-HOM table is signalled to the UE, e.g. using RRC (Radio Resource Control) signalling or MAC (Media Access Control) signalling. This signalling comprises signalling a reference to the non-HOM table(s) to be used or signalling the actual entries of the non-HOM table(s).

The signal HOM table(s) step 27 and the signal non-HOM table(s) step 28 can optionally be implemented in a single signal selected table(s) step.

The signaling of tables does not need to occur very frequently. In other words, this signalling does not need to occur every sub-frame but can instead occur more infrequently.

Once the HOM or non-HOM tables are signalled to the UE, both the UE and the network node use the same tables. It is to be noted that this only defines the table(s) to use; the entry in the table is then selected from the available entries. In particular, the HOM tables (see e.g. Table 3 and Table 4) have entries which are not of HOM and can be 64QAM, 16QAM and even QPSK to be able to quickly adapt to changing radio conditions.

Figure 6A:
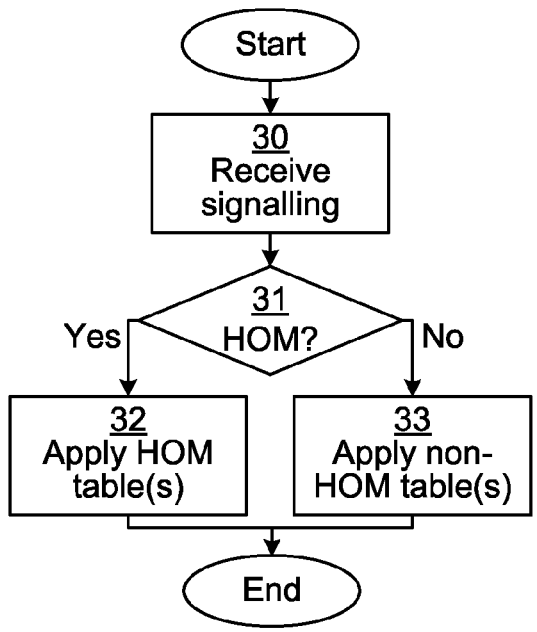
FIGS. 6A-B are flow charts illustrating embodiments of methods performed in the UE(s) of FIG. 1.
Figure 6B:
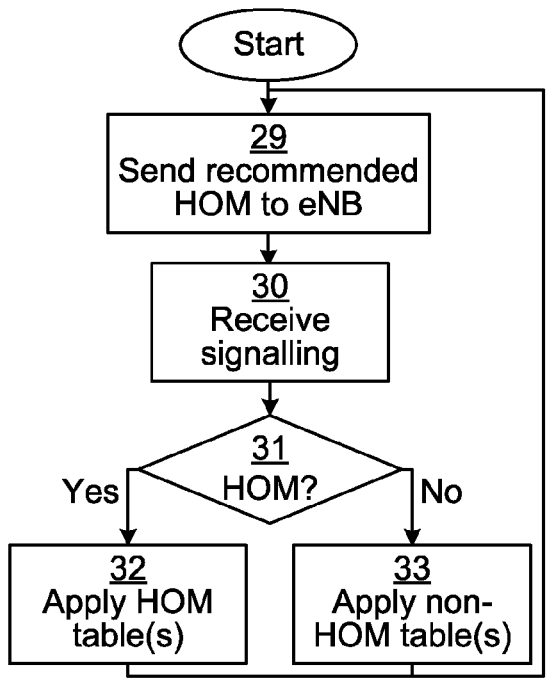

FIGS. 6A-B are flow charts illustrating embodiments of methods performed in the UE(s) of FIG. 1. The method is performed to enable selection of modulation mode for the UE. The method can be performed in parallel by multiple UEs.

First the method of the flow chart of FIG. 6A will be described.

In a receive signalling step 30, signalling is received which indicates whether a HOM table is to be applied or a non-HOM table is to be applied. This signalling is received from the network node.

In a conditional HOM step 31, it is determined if a HOM table is to be applied or not. This can be determined from the signalling received in the receive signalling step 30. If this is the case, the method proceeds to the apply HOM table(s) step 32. Otherwise, the method proceeds to the apply non-HOM table(s) step 33.

In the apply HOM table(s) step 32, the HOM table(s) is/are applied, e.g. as described above, e.g. comprising an MCS index table and/or CQI index table comprising at least one HOM entry.

In an apply non-HOM table(s) step 33, the non-HOM table(s) is/are applied, e.g. as described above, e.g. comprising an MCS index table and/or CQI index table without any HOM entries.

Looking now to FIG. 6B, only new or modified steps compared to the method illustrated by the flow chart of FIG. 6A will be described.

In a send recommended HOM to eNB step 29, a recommendation whether to support HOM or not is transmitted to the eNB. This can e.g. be based on the power usage and/or UE type criteria described above.

Figure 7:
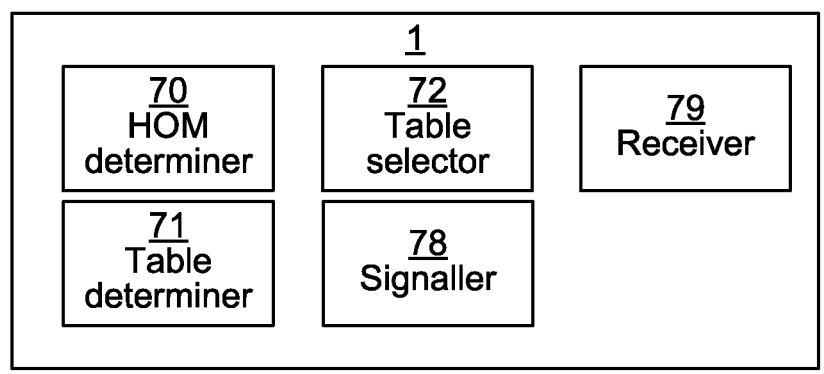
FIG. 7 is a schematic diagram showing functional modules of the network node of FIGS. 1 and 3.

FIG. 7 is a schematic diagram showing functional modules of the network node 1 of FIGS. 1 and 3. The modules can be implemented using software instructions such as a computer program executing in the network node 1 and/or using hardware, such as application specific integrated circuits, field programmable gate arrays, discrete logical components, etc. The modules correspond to the steps in the methods illustrated in FIGS. 5A-B.

A HOM determiner 70 is configured to determine whether to provide HOM mode support for the UE. This module corresponds to the conditional HOM step 20 of FIGS. 5A-B.

A table selector 72 is configured to select HOM table(s) or non-HOM table(s) as appropriate. This module corresponds to the select HOM table(s) step 22 and the select non-HOM table(s) step 26 of FIGS. 5A-B.

A receiver 79 is configured to receive a HOM recommendation. This module corresponds to the receive HOM recommendation step 19 of FIG. 5B.

A table determiner 71 is configured to determine whether the currently active table(s) for the UE is HOM table(s) or not. This module corresponds to the conditional HOM step 20 of FIG. 5B.

A signaller 78 is configured to signal selected HOM table(s) or non-HOM table(s). This module corresponds to the signal HOM table(s) step 27 and the signal non-HOM table(s) step 28 of FIG. 5B.

Figure 8:
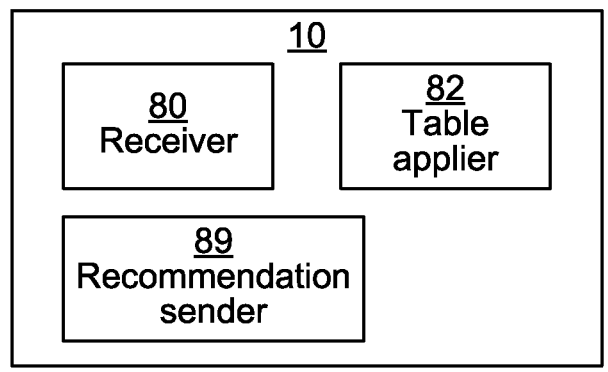
FIG. 8 is a schematic diagram showing functional modules of the UE of FIGS. 1 and 2.

FIG. 8 is a schematic diagram showing functional modules of the UE 10 of FIGS. 1 and 2. The modules can be implemented using software instructions such as a computer program executing in the UE 10 and/or using hardware, such as application specific integrated circuits, field programmable gate arrays, discrete logical components, etc. The modules correspond to the steps in the methods illustrated in FIGS. 6A-B.

A receiver 80 is configured to receive signalling indicating a HOM table. This module corresponds to the receive HOM signalling step 30 of FIGS. 6A-B.

A table applier 82 is configured to apply the HOM table. This module corresponds to the apply HOM signalling step 32 of FIGS. 6A-B.

A recommendation sender 89 is configured to transmit a recommendation whether to support HOM. This module corresponds to the send recommended HOM to eNB step 29 of FIG. 6B.

ABBREVIATIONS

AGC Automatic Gain Control
CQI Channel Quality Indicator
DCI Downlink Control Information
DRX Discontinuous Reception
eNB E-UTRAN NodeB
E-UTRAN Evolved Universal Terrestrial Radio Access Network
GSM Global System for Mobile communications
HOM Higher Order Modulation
LTE Long Term Evolution
MCS Modulation and Coding Scheme
PDSCH Physical Downlink Shared Channel
QPSK Quadrature Phase-shift Keying
RRC Radio Resource Control
SINR Signal to Interference and Noise Ratio
UCI Uplink Control Information
UE User Equipment
UMB Ultra Mobile Broadband
WCDMA Wideband Code-Division Multiple Access
WiMAX Worldwide Interoperability for Microwave Access
16QAM 16 Quadrature Amplitude Modulation
64QAM 64 Quadrature Amplitude Modulation
256QAM 256 Quadrature Amplitude Modulation
3GPP 3rd Generation Partnership Project The invention has mainly been described above with reference to a few embodiments. However, as is readily appreciated by a person skilled in the art, other embodiments than the ones disclosed above are equally possible within the scope of the invention.

Enumerated Embodiments

In the following a number of non-limiting embodiments will be presented, enumerated with roman numerals.

i. A method, performed in a network node, for enabling selection of modulation mode for a user equipment, UE, the method comprising:
  determining whether to provide the ability for higher order modulation, HOM, for the UE;
  when HOM is to be provided, selecting at least one HOM table for the UE.

ii. The method according to embodiment i, further comprising:
  when HOM is not to be provided, selecting at least one non-HOM table for the UE.

iii. The method according to embodiment i or ii, wherein the table for HOM comprises at least one entry for 256QAM.

iv. The method according to any one of the preceding embodiments, wherein the at least one HOM table includes an MCS index table and the at least one non-HOM table includes an MCS index table.

v. The method according to any one of the preceding embodiments, wherein the at least one HOM table includes a CQI index table and the at least one non-HOM table includes a CQI index table.

vi. The method according to any one of the preceding embodiments, further comprising:
  when HOM is to be provided, signalling the selected at least one HOM table to the UE;
  when HOM is not to be provided, signalling the selected at least one non-HOM table to the UE.

vii. The method according to any one of the preceding embodiments, further comprising:
  when HOM is to be provided, signalling a HOM entry in a current modulation table to the UE;
  when HOM is not to be provided, signalling a non-HOM entry in a current modulation table to the UE.

viii. A network node arranged to enable selection of modulation mode for a user equipment, UE, the network node comprising:
  a processor; and
  a memory storing instructions that, when executed by the processor, cause the network node to:
  determine whether to provide the ability for higher order modulation, HOM, for the UE;
  when HOM is to be provided, select at least one HOM table for the UE.

ix. A computer program for enabling selection of modulation mode for a user equipment, UE, the computer program comprising computer program code which, when run on a network node, causes the network node to:
  determine whether to provide the ability for higher order modulation, HOM, for the UE;
  when HOM is to be provided, select at least one HOM table for the UE.

x. A computer program product comprising a computer program according to embodiment ix and a computer readable means on which the computer program is stored.

xi. A method, performed in a user equipment, UE, for enabling selection of modulation mode for the UE, the method comprising:
  receiving signalling indicating a selected HOM, higher order modulation, table; and
  applying the selected HOM table.

xii. A user equipment, UE, arranged to enable selection of modulation mode for the UE, the UE comprising:
  a processor; and
  a memory storing instructions that, when executed by the processor, cause the UE to:
  receive signalling indicating a selected HOM, higher order modulation, table; and
  apply the selected HOM table.

xiii. A computer program comprising computer program code user for enabling selection of modulation mode for the UE which, when run on a UE, causes the UE to:
  receive signalling indicating a selected HOM, higher order modulation, table; and
  apply the selected HOM table.

xiv. A computer program product comprising a computer program according to embodiment xiii and a computer readable means on which the computer program is stored.

The invention claimed is:

1. A method, performed in a network node, for enabling selection of modulation mode for a user equipment, UE, the method comprising:
  receiving a recommendation whether to support higher order modulation, HOM, from the UE;
  determining whether to provide HOM mode support for the UE, the determining comprises considering the recommendation whether to support HOM from the UE;
  when HOM mode support is to be provided, selecting at least one HOM table for the UE; and
  when HOM mode support is not to be provided, selecting at least one non-HOM table for the UE.

2. The method according to claim 1, wherein the at least one HOM table comprises at least one entry for 256 QAM, Quadrature Amplitude Modulation.

3. The method according to claim 1, wherein each HOM table comprises at least one entry with a modulation of a higher order compared to all entries of any non-HOM table of the same type.

4. The method according to claim 1, further comprising:
  when HOM mode support is to be provided, signalling a reference to the selected at least one HOM table to the UE; and
  when HOM mode support is not to be provided, signalling a reference to the selected at least one non-HOM table to the UE.

5. The method according to claim 1, wherein the step of determining whether to provide HOM mode support comprises determining to provide HOM support when HOM is expected to provide a relative spectral efficiency increase greater than a relative UE power consumption increase.

6. The method according to claim 3, wherein the at least one HOM table includes an MCS index table and the at least one non-HOM table includes an MCS index table.

7. The method according to claim 3, wherein the at least one HOM table includes a CQI index table and the at least one non-HOM table includes a CQI index table.

8. The method according to claim 3, further comprising:
  when HOM mode support is to be provided, signalling the selected at least one HOM table to the UE; and
  when HOM mode support is not to be provided, signalling the selected at least one non-HOM table to the UE.

9. A network node arranged to enable selection of modulation mode for a user equipment, UE, the network node comprising:

a processor; and a memory storing instructions that, when executed by the processor, cause the network node to:

receive a recommendation whether to support higher order modulation, HOM, from the UE;

determine whether to provide HOM mode support for the UE, the determination comprises consideration of the recommendation whether to support HOM from the UE;

when HOM mode support is to be provided, select at least one HOM table for the UE; and when HOM mode support is not to be provided, select at least one non-HOM table for the UE.

10. The network node according to claim 9, wherein the at least one HOM table comprises at least one entry for 256 QAM, Quadrature Amplitude Modulation.

11. The network node according to claim 9, wherein each HOM table comprises at least one entry with a modulation of a higher order compared to all entries of any non-HOM table of the same type.

12. The network node according to claim 9 further comprising instructions that, when executed by the processor, cause the network node to: when HOM mode support is to be provided, signal a reference to the selected at least one HOM table to the UE; and when HOM mode support is not to be provided, signal a reference to the selected at least one non-HOM table to the UE.

13. The network node according to claim 9, wherein the instructions to determine whether to provide HOM mode support comprise instructions that, when executed by the processor, cause the network node to: determine to provide HOM support when HOM is expected to provide a relative spectral efficiency increase greater than a relative UE power consumption increase.

14. The network node according to claim 11, wherein the at least one HOM table includes an MCS index table and the at least one non-HOM table includes an MCS index table.

15. The network node according to claim 11, wherein the at least one HOM table includes a CQI index table and the at least one non-HOM table includes a CQI index table.

16. The network node according to claim 11, further comprising instructions that, when executed by the processor, cause the network node to: when HOM mode support is to be provided, signal the selected at least one HOM table to the UE; and when HOM mode support is not to be provided, signal the selected at least one non-HOM table to the UE.

17. A network node comprising:

means for receiving a recommendation whether to support higher order modulation, HOM, from a user equipment, UE;

means for determining whether to provide HOM mode support for the UE, the determining comprises considering the recommendation whether to support HOM from the UE;

means for, when HOM mode support is to be provided, selecting at least one HOM table for the UE; and means for, when HOM mode support is not to be provided, selecting at least one non-HOM table for the UE.

18. A non-transitory computer readable medium on which a computer program for enabling selection of modulation mode for a user equipment, UE, is stored, comprising computer program code which, when run on a network node, causes the network node to:

receive a recommendation whether to support higher order modulation, HOM, from the UE;

determine whether to provide HOM mode support for the UE, the determination comprises consideration of the recommendation whether to support HOM from the UE;

when HOM mode support is to be provided, select at least one HOM table for the UE; and when HOM mode support is not to be provided, select at least one non-HOM table for the UE.

19. A method, performed in a user equipment, UE, for enabling selection of modulation mode for the UE, the method comprising:

transmitting, by the UE, a recommendation whether to support higher order modulation, HOM;

receiving signalling indicating whether a HOM table is to be applied or a non-HOM table is to be applied;

applying a HOM table when a HOM table is to be applied; and applying a non-HOM table when a non-HOM table is to be applied.

20. A user equipment, UE, arranged to enable selection of modulation mode for the UE, the UE comprising:

a processor; and a memory storing instructions that, when executed by the processor, cause the UE to:

transmit a recommendation whether to support higher order modulation, HOM;

receive signalling indicating whether a HOM table is to be applied or a non-HOM table is to be applied;

apply a HOM table when a HOM table is to be applied; and apply a non-HOM table when a non-HOM table is to be applied.

21. A user equipment, UE, comprising:

means for transmitting, by the UE, a recommendation whether to support higher order modulation, HOM;

means for receiving signalling indicating whether a HOM table is to be applied or a non-HOM table is to be applied;

means for applying a HOM table when a HOM table is to be applied; and means for applying a non-HOM table when a non-HOM table is to be applied.

22. A non-transitory computer readable medium on which a computer program for enabling selection of modulation mode for a user equipment, UE, is stored, comprising computer program code which, when run on the UE, causes the UE to:

transmit, by the UE, a recommendation whether to support higher order modulation, HOM;

receive signalling indicating whether a HOM table is to be applied or a non-HOM table is to be applied;

apply a HOM table when a HOM table is to be applied; and apply a non-HOM table when a non-HOM table is to be applied.

* * * * *